March 10, 1931.   A. J. DEXTER   1,795,929
STITCHER FOR TIRE BUILDING MACHINES
Filed Sept. 24, 1928
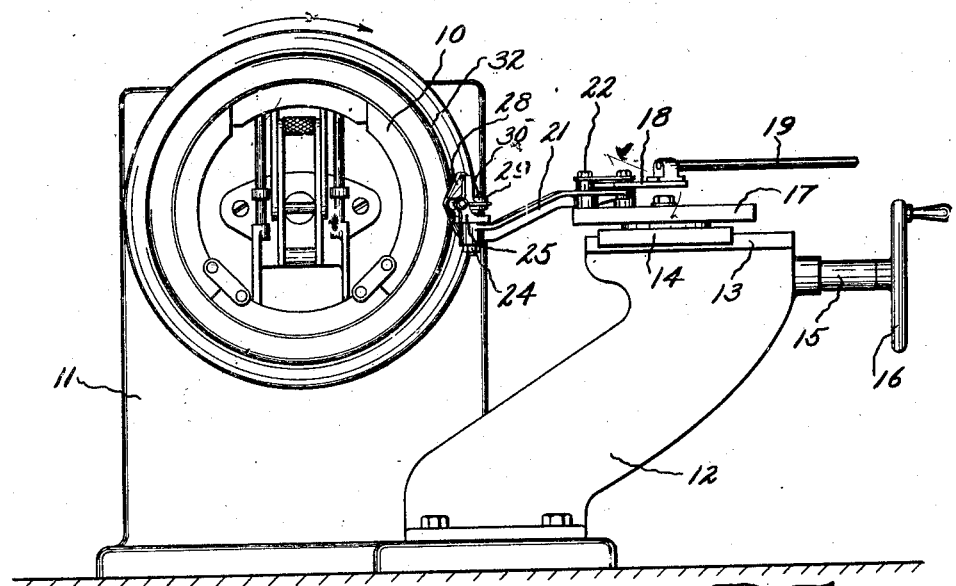
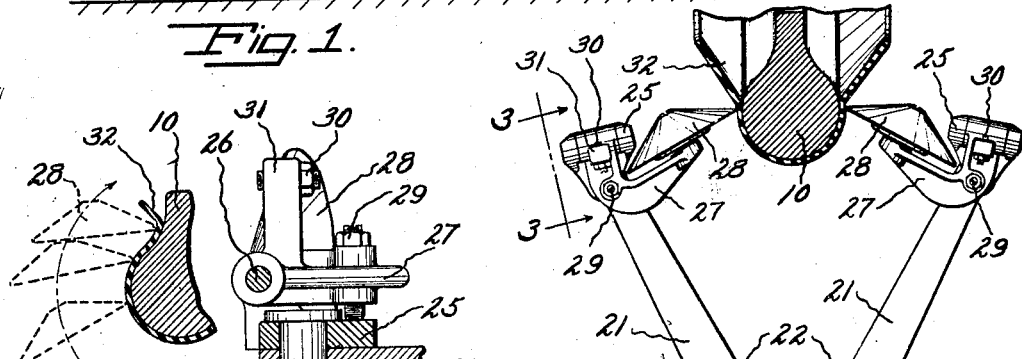
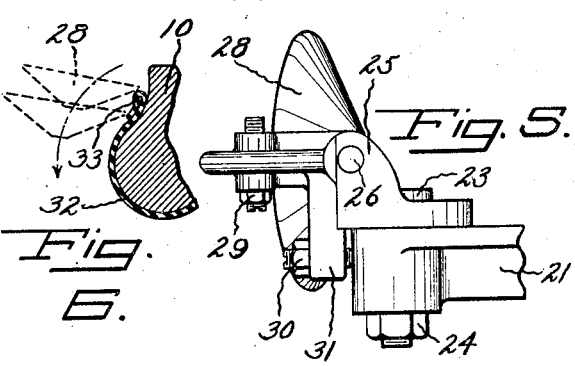
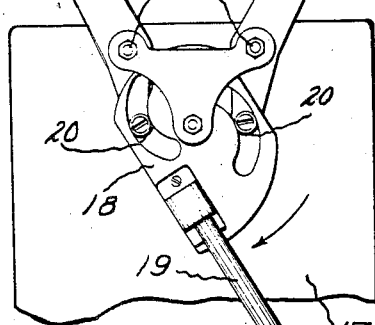
INVENTOR.
ALBERT J. DEXTER.
BY
ATTORNEY.

Patented Mar. 10, 1931                                           1,795,929

UNITED STATES PATENT OFFICE

ALBERT J. DEXTER, OF SPRINGFIELD, MASSACHUSETTS, ASSIGNOR TO THE FISK RUBBER COMPANY, OF CHICOPEE FALLS, MASSACHUSETTS, A CORPORATION OF MASSACHUSETTS

STITCHER FOR TIRE-BUILDING MACHINES

Application filed September 24, 1928. Serial No. 307,955.

My invention relates to tire building machines and more particularly to a stitching device on machines of this character using a tire building core. One of the objects of my invention is to provide a stitching device which will perform substantially all the stitching operations necessary to the fabrication of a tire carcass ready for vulcanization. Another object is to provide a stitching device which is simple in construction and operation. Other objects will be evident from the following specification and claims:

In the drawings which illustrate one embodiment of my invention,

Fig. 1 is a side view of my invention shown in operative position;

Fig. 2 is a partial plan view of Fig. 1 and on a larger scale;

Fig. 3 is a partial sectional view taken from the line 3—3 in Fig. 2;

Fig. 4 is a diagrammatic view of the stitcher roll movements when the stitcher roll is in the position shown in Fig. 3;

Fig. 5 is a view similar to Fig. 3 except that the roll has been pivoted; and

Fig. 6 is a diagrammatic view of the stitcher roll movements when the stitcher roll is in the position shown in Fig. 5.

Referring to the drawings, 10 represents a collapsible tire building core supported by a housing 11 containing suitable driving means to rotate the core 10 in the direction of the arrow in Fig. 1. A standard 12 is secured adjacent the housing 11 and in the same plane as the core 10. Slidably positioned on guideways 13 is a slide 14 adapted to be moved toward and from the core 10 by a threaded shaft 15 to which is attached a handwheel 16. Pivotally mounted on the slide 14 is a block 17 on which is rotatably mounted a slotted cam plate 18 adapted to be rotated by handle 19. Engaging the slotted cam plate 18 are rollers 20 fastened to arms 21 which are pivotally mounted to the block 17 at 22. Adjustably secured at the ends of the arms 21 by studs 23 and nuts 24 are bearings 25. Pivotally secured to the bearings 25 at 26 are angle brackets 27 which support stitching rolls 28. Adjustable stops 29 are formed in the brackets 27 and adjustable stops 30 are formed in lugs 31 of the brackets 27 as shown in Figs. 3 and 5. These stops 29 and 30 permit the brackets 27 to be rotated in a vertical plane about pivot 26 to two operating positions substantially 180° apart thus enabling the stitching rolls 28, which are carried by the brackets, to be used both ways as illustrated in Figures 3 to 6.

In Figures 1 and 2 I have shown my improved stitching device stitching to the core 10 the first two plies or pocket 32 of a tire carcass. The operator has moved the stitching rolls 28 into contact with the carcass by rotating the handwheel 16 and has applied the necessary stitching pressure by pulling the handle 19 in the direction of the arrow in Figure 2. Then by a continued advancement of the stitching rolls as shown in Figure 4 the plies are ready for the next building operation which may be the positioning of a bead 33. The plies then must be turned over the bead and this operation may be accomplished by pivoting the stitching roll as shown in Figure 5 and reversing the movements of the stitching rolls as shown by the arrow in Figure 6. The turn back portions of the plies may be turned over the beads by hand before the stitching rolls are moved into the position shown in Figure 5, and the movements of the stitching rolls reversed as indicated in Figure 6.

When the stitching device is not needed for building operations it may be swung out of the way by the use of the pivot connection between the block 17 and the slide 14.

As will be evident from the foregoing any additional plies, sidewall, chafing strips, etc., may be stitched and turned over into place in the same manner without changing any of the adjustment on the stitching rolls or apparatus.

Having thus described my invention, I claim:

1. A device of the character described comprising a plurality of stitching rolls adapted to be positioned in operating relation with a tire carcass on a tire building core, a pivoted support for said rolls, and adjustable stops on said support to hold the stitching rolls in two predetermined operating positions substantially 180° apart.

2. A device of the character described comprising a stitching roll adapted to be positioned in operative relation with a tire carcass on a tire building core, a pivoted support for said roll and stops on said support to hold the stitching roll in two predetermined operating positions substantially 180° apart.

3. A device of the character described comprising a stitching roll adapted to be positioned in stitching relation with a tire carcass on a tire building core, said stitching roll being pivoted for movement bodily through an arc of substantially 180° to permit stitching in opposite directions.

4. A device of the character described comprising a stitching roll, a support for said roll adapted to position the roll in stitching relation with a tire carcass on a tire building form and means reversibly connecting the roll to the support to permit stitching in opposite directions.

ALBERT J. DEXTER.